April 13, 1926.
E. D. CHURCH
AUTOMATIC MEASURING DEVICE
Filed July 6, 1925
1,580,585
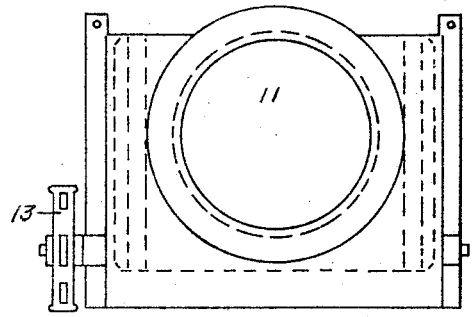
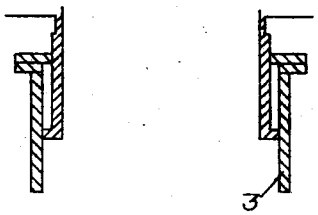
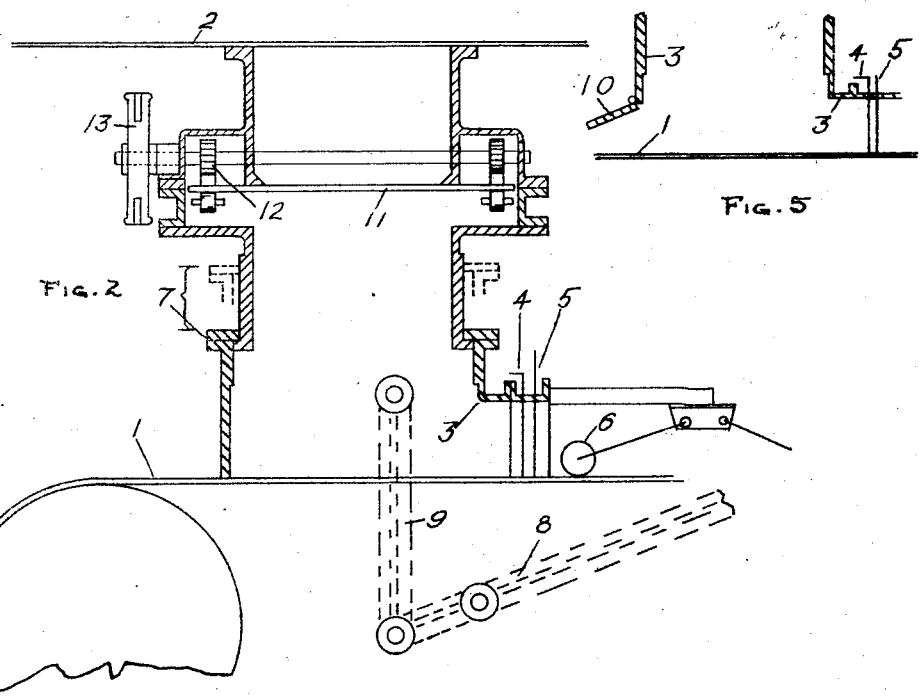
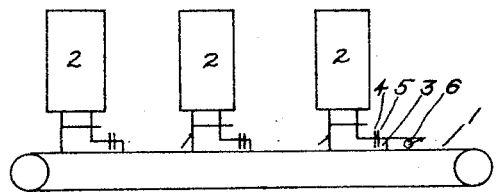
INVENTOR
Edgar D. Church
BY
George B. Willcox
ATTORNEY Patented Apr. 13, 1926.

1,580,585

UNITED STATES PATENT OFFICE.

EDGAR D. CHURCH, OF SAGINAW, MICHIGAN, ASSIGNOR TO JACKSON & CHURCH COMPANY, OF SAGINAW, MICHIGAN, A CORPORATION OF MICHIGAN.

AUTOMATIC MEASURING DEVICE.

Application filed July 6, 1925. Serial No. 41,794.

*To all whom it may concern:*

Be it known that I, EDGAR D. CHURCH, a citizen of the United States, residing at Saginaw, in the county of Saginaw and State of Michigan, have invented certain new and useful Improvements in Automatic Measuring Devices; and I do hereby declare the following to be a full, clear, and exact description of the invention, such as will enable others skilled in the art to which it appertains to make and use the same.

This invention relates to measuring devices and pertains more particularly to that class of measuring devices adapted for measuring materials such as lime, sand or the like, while being delivered from a storage hopper onto a belt conveyor or equivalent device.

A measuring machine of the kind to which my present improvement is especially well adapted is described in Patent No. 1,460,573, issued July 3, 1923, to Edgar D. Church et al. That machine comprises a hopper located above a traveling belt, the hopper provided with a gate adjustable as to height so as to deliver a layer of material of uniform thickness upon the belt. The machine is equipped with a shoe or roller that rides on the top surface of the traveling layer of material and is provided with mechanism to regulate the rate of feed from the hopper to the belt.

In the patent referred to, one hopper and one feed device are shown in conjunction with one belt.

My present invention, while employing the mechanisms referred to, introduces a novel combination of them that in its embodiment carries forward the idea of automatic measuring from a hopper to a traveling belt and increases the producing capacity of a plant equipped with such machines, without greatly increasing the amount of machinery employed for the measuring operation.

Where one belt and only one hopper is used, as in the machine of the patent referred to, emptying the hopper results in loss of operating time by shutting down the machine. A purpose of my present invention is to so change the construction of the delivery end of the hopper that several supply hoppers, say, three or more, each with its own automatically regulated gate or measuring device, will be available to feed to a single belt. When a hopper of the series becomes empty any one of the others can supply material to the belt in a layer of predetermined thickness. Empty hoppers can be filled without disturbing the operation of the one which is feeding.

My present invention pertains more specifically to means for preventing the non-working hoppers, whether filled or empty, from obstructing the passage of material beneath their discharge heads and flow-regulating shoes or rollers.

I accomplish this result in either of two ways; first and preferably, by arranging the lower part of each hopper, together with its automatic measuring devices, so it can be raised clear of the belt. Or, as an alternative construction, I arrange the back wall of each hopper so it can be opened, permitting the passage of material from another hopper through its discharge head. In the latter arrangement the lower end of the hopper need not be lifted, but in both arrangements the hopper is made so its discharge head can be moved or adjusted to clear the moving layer of material.

With the foregoing and certain other objects in view which will appear later in the specifications, my invention consists in the devices described and claimed, and the equivalents thereof.

In the drawings, Fig. 1 is a diagrammatic side view showing a number of hoppers arranged over a single belt, and embodying my improvement.

Fig. 2 is a vertical longitudinal section through the neck of the hopper and the feeding device.

Fig. 3 is a top plan view of the shut-off valve or gate by which the bottom discharge outlet of the hopper can be opened or closed.

Fig. 4 shows the discharge head of the hopper of Fig. 2 in its raised position.

Fig. 5 is a detail showing the back wall of a hopper discharge head, the wall provided with a movable gate, this being a modified means for transferring material from a hopper that is feeding, past successive hoppers that are inoperative.

As is clearly shown in the drawings, the device consists in the usual conveyor 1, which may be of any suitable type, as an endless belt, together with a plurality of storage hoppers 2, each having a lower end or discharge head 3 in the form of a bottomless box provided with a gage gate 4 adjustable in height to deliver to the conveyor a predetermined thickness of material. In practice this gage gate is set by hand at the desired height and is fixed in that position. It is also used as a shut-off gate if required.

A second gate 5 is also provided. This gate is also adjustable and is used to gage very accurately the surface of the material, whereby an accurate regulation of the thickness of the material may be had. As in the previous patent referred to, I provide a vertically movable rider 6, which may be in the form of a sliding shoe or roller or any equivalent thereof, the lower surface of the rider adapted to rest upon the top surface of the traveling layer of material on the conveyor. The rider is mounted on a frame carried by the discharge head 3.

The riders 6 may by suitable electrical connections, such as those shown in the patent above referred to, be made to actuate certain agitators or rappers in the hopper, or they may be employed to automatically shut off or start the motor that drives the conveyor belt.

Since the specific arrangement and mode of operation of such connections is not material to an understanding of my present invention, they are not illustrated herein.

Up to this point I have described the usual construction of a hopper fed conveyor. I will now set forth the novel features of my present improvement.

Referring to Fig. 1, I provide a single conveyor 1, above which are several feed hoppers 2, each having a discharge head 3 with its gage gates 4 and 5 and the usual rider 6. The right-hand hopper of Fig. 1, taken as an example, can feed in the customary manner, but if for any reason that hopper is not working and it is desired to feed past it from either of the other hoppers, my invention provides means to prevent interference with the traveling layer of material by the discharge head 3 of the said right-hand hopper.

My improvement provides on each of the hoppers, or at least on all except the left-hand hopper of Fig. 1, lifting means by which the discharge head can be moved to clear the layer of material, whereby, as above stated, the material delivered to the belt from one hopper may freely pass the discharge heads of the remaining hoppers. This lifting means may consist, as shown in the preferred form of Figs. 2 and 4, in a device for bodily raising the discharge head 3 and its gates 4 and 5 and rider 6, or, as in the alternative form of Fig. 5, the body of the discharge head may remain in place on the belt, and its back wall may be provided at its lower end with a removable closure such as a door 10, that can be lifted clear of the layer of material to allow the material to pass.

The gates 4 and 5 and the riders 6 can also be raised by hand high enough to clear the material. The result is the same as if the entire hopper were raised, as in Fig. 4.

Specifically, the preferred form consists in a telescoping neck 7 on the discharge head 3. and a lever 8 pivotally supported at the side of the belt and connected by a link 9 with the discharge head 3. This lever enables the operator to lift the lower end of the discharge head and with it the gates 4 and 5 and rider 6.

In the form shown in Fig. 5 the lifting levers are omitted and a door 10 or its equivalent provided in the lower end of the back wall of discharge head 3. When lifted, as shown in Fig. 5, these doors permit the free passage of the layer of material from any one hopper through the discharge heads of the other hoppers above the conveyor.

I also provide suitable means for shutting off any one of the hoppers from communication with its discharge head, so the hopper can be filled while one of the others is feeding. The shut-off consists in the usual valve gate 11 operated by rack and pinion 12 and hand wheel 13, as is common in feed hoppers of this kind.

By the means above described a single belt or conveyor may receive its material, not from a single hopper only, as heretofore, but from any one of several hoppers, without any interference by the remaining hoppers or their associated mechanisms; consequently a continuous and adequate supply is assured, and the plant capacity is maintained even though one, or all but one, of the hoppers becomes empty.

Having thus described my invention, what I claim and desire to secure by Letters Patent is:

1. In combination, a conveyor, a plurality of hoppers each having a discharge head above said conveyor and provided with a gage gate for regulating the thickness of the layer of material delivered to the conveyor, certain of said discharge heads having their lower ends movable and adapted to be lifted clear of the layer of material, whereby the material delivered to the belt from one hopper may freely pass the discharge heads of the remaining hoppers.

2. In combination, a conveyor, a plurality of hoppers each having a discharge head above said conveyor and provided with a gage gate for regulating the thickness of the layer or material delivered to the conveyor, certain of said discharge heads provided with telescopic necks, whereby the lower ends of the discharge heads are capable of being raised clear of the layer of material so that the material delivered to the belt from one hopper may freely pass the discharge heads of the remaining hoppers.

In testimony whereof, I affix my signature.

EDGAR D. CHURCH.